United States Patent [19]

Sortwell

[11] Patent Number: 4,499,214

[45] Date of Patent: Feb. 12, 1985

[54] METHOD OF RAPIDLY DISSOLVING POLYMERS IN WATER

[75] Inventor: Edwin T. Sortwell, Wheaton, Ill.

[73] Assignee: Diachem Industries, Inc., Batavia, Ill.

[21] Appl. No.: 491,070

[22] Filed: May 3, 1983

[51] Int. Cl.³ .................. C08F 6/24; C08J 3/04; C08J 3/08
[52] U.S. Cl. .................... 523/336; 106/205; 106/208; 523/309; 524/28; 524/55
[58] Field of Search ............... 523/336, 309; 524/28, 524/55; 106/205, 208

[56] References Cited

U.S. PATENT DOCUMENTS

| Re. 28,474 | 7/1974 | Anderson et al. | 523/336 |
| Re. 28,576 | 10/1975 | Anderson et al. | 523/336 |
| 2,376,656 | 5/1945 | Buchanan | 106/208 |
| 3,122,203 | 2/1964 | Hawkins | 166/38 |
| 3,852,234 | 12/1974 | Venema | 523/336 |
| 4,040,967 | 8/1977 | Nimerick et al. | 524/55 |
| 4,048,377 | 9/1977 | Boschetti et al. | 524/55 |
| 4,218,262 | 8/1980 | Warren | 106/208 |
| 4,299,755 | 11/1981 | Keggenhoff et al. | 524/55 |
| 4,312,675 | 1/1982 | Pickens et al. | 106/208 |
| 4,336,145 | 6/1982 | Briscoe | 524/55 |

Primary Examiner—Ronald W. Griffin
Attorney, Agent, or Firm—Wood, Dalton, Phillips, Mason & Rowe

[57] ABSTRACT

Water-soluble polymers are rapidly dissolved in water by dispersing finely divided particles of the polymer into a liquid carrier in which the polymer is insoluble to form a suspension. The suspension is then added to water in order to release the polymer into the water as discrete particles that rapidly dissolve. The polymer particles are preferably prepared by cryogenic grinding, or another non-molecularly destructive process.

22 Claims, No Drawings

METHOD OF RAPIDLY DISSOLVING POLYMERS IN WATER

BACKGROUND OF THE INVENTION

1. Field of the Invention

This invention relates to water-soluble polymers and, more particularly, to a method of rapidly dissolving such polymers in water.

2. Description of the Prior Art

The use of solutions of water-soluble polymers in thickening and flocculating applications is well known. Such applications include the clarification of aqueous solutions in papermaking, and in treatment of sewage and industrial wastes. Such solutions of polymers are also useful as stabilizers for drilling muds, and in the secondary recovery of petroleum by waterflooding.

Although these polymers are most often available commercially as powders or as finely divided solids, they are most frequently utilized in aqueous solutions. This necessitates that the solid polymer material be dissolved in water. Although the various polymers are more or less soluble in water, difficulty is often experienced in preparing aqueous polymer solutions because of their slow dissolution and because the solid polymer is not readily dispersible in water.

Furthermore, dispersion of solid polymers in water is hindered by their tendency to clump or remain as agglomerates on contact with water. Lumps of solid polymer immediately form by the encapsulation of undissolved solids in an outer coating of water-wet polymer which retards the penetration of additional water into the agglomerate. Although many of these lumps are eventually dissolved by continued agitation, it is frequently impractical to agitate the solution for a sufficiently long period to obtain complete dissolution.

The foregoing problems are described in U.S. Pat. Nos. Re. 28,474 (Jul. 8, 1974) and U.S. Pat. No. Re. 28,576 (Oct. 21, 1975) issued to Anderson et al., the respective disclosures of which are hereby incorporated by reference.

The above-identified Anderson et al reissue patents describe a method of rapidly dissolving water-soluble polymers in which a polymer is dispersed into a water-in-oil emulsion, which emulsion is then inverted in water to release the polymer into solution. The Anderson et al disclosures require an oil-to-water ratio between 5:1 and 1:10.

According to the Anderson et al disclosures, emulsions containing between 5 and 75 weight percent polymer dispersed therein can be prepared and inverted into aqueous solution. However, it has been found in practice that the upper limit of the polymer content of an emulsion made according to the Anderson et al process is much lower than 75 weight percent, and usually is in the 10-35 weight percent range, depending upon the characteristics of the particular emulsion.

Further, the Anderson et al system, in practice, requires substantial amounts (e.g. 20 wt. %, or more, based on oil) of an emulsifier in the oil/water/polymer emulsion to provide a stable product.

SUMMARY OF THE INVENTION

It is an object of the invention to overcome one or more of the problems described above.

According to the present invention, water soluble polymers or gums, or mixtures thereof, are rapidly dissolved in water by a method which comprises the steps of:

(a) dispersing particles of the polymer or gum into a non-aqueous liquid carrier in which the polymer or gum is insoluble, to form a suspension, and, (b) adding the suspension to water with mixing to release the polymer into water as discrete particles that rapidly dissolve.

The suspension may be added to water in the presence of an emulsifier or a surfactant. Alternatively, an emulsifier may be added to the liquid carrier before addition of the polymer or gum to the carrier. The liquid carrier may be soluble or insoluble in water. The polymer or gum particles are preferably prepared by a comminution process which does not degrade the molecular structure of the polymer or gum. Only very low levels of emulsifier and/or surfactant, or none at all, are required to provide a stable product.

Other objects and advantages will be apparent from the following detailed description.

DETAILED DESCRIPTION OF THE INVENTION

The Water Soluble Polymers

These polymers are well known in the art and have been described in numerous publications and patents. They include, but are not limited to, naturally occuring galactomannan gums such as guar and locust bean gums, alginate salts, biologically produced polymers (e.g. Xanthan gum), polyethylene oxides, water soluble condensation polymers, and vinyl addition polymers such as polyacrylamides and copolymeric derivatives of acrylamide with, for example, acrylic acid, maleic anhydride, acrylonitrile, styrene, allyl or diallyl amines or dimethylaminoethylmethacrylate (DMAEM). Such polymers may be nonionic, anionic or cationic.

The gums are well-known water-soluble polymers, and include those described in Volume 10 of the Encyclopedia of Chemical Technology, 2nd Edition, Interscience Publishers, 1966.

The molecular weight of the polymers described above may vary over a wide range, e.g. between about 10,000-25,000,000, and molecular weight is not a critical parameter in this invention. The invention finds its greatest usefulness in preparing aqueous solutions or dispersions of these polymers and is particularly useful with respect to acrylamide polymers, the molecular weights of which are in excess of 1 million.

Polymers having relatively high molecular weights previously were dissolved in water only with difficulty and tended to form extremely viscous solutions at relatively low concentrations. The polymers may be produced by any suitable method of conducting polymerization reactions. Thus, solution, suspension or emulsion polymerization techniques may be used.

As used herein, the term "polymer" is understood to include polymers and gums which are soluble in water to a significant degree. The polymers are solid, but may have a substantial water content.

The invention is capable of rapidly producing aqueous solutions of water soluble synthetic or natural polymers having polymer concentrations within the range of 0.1-10% by weight, with preferred concentrations within the range of 0.2-2.0% by weight.

The Comminution Process

The rate of polymer dissolution in water is a function of surface area and, consequently, particle size. Polymers produced by most manufacturing processes are in the form of powders or lump-like agglomerates. Large particle sizes minimize handling and dusting problems and reduce the formation of gel particles during dissolution in water. However, large particle size increases dissolving time when dry particles are added directly to water.

Therefore, it is desirable that the particles be comminuted by grinding, abrading or slicing so as develop the large surface area which promotes rapid dissolution when the polymer particles subsequently contact water. The preferred particle size of the polymer or gum is determined by the desired improvement in dissolution rate in water and will generally be less than 100 microns and preferably less than 70 microns. Small particle size also promotes suspension stability.

Many of the polymers amenable to this process are subject to molecular degradation by heat generation during comminution. For such heat sensitive polymers, comminution without molecular degradation may be achieved through cryogenic grinding, such as by the use of carbon dioxide or liquid nitrogen to reduce the temperature of the polymer prior to and/or during the grinding or slicing process. Certain polymers that become plastic or sticky at temperatures developed in ambient temperature grinding processes can also benefit from cryogenic grinding.

Such cryogenic processes employ pulverizing equipment such as that marketed by Pulverizing Machinery Company of Summit, N.J. under the trademark "MikroPul". Comminuting equipment that employs a slicing action, such as that sold by Urschell Laboratories of Valparaiso, Ind. under the trademark "Comitrol" may be additionally employed to further reduce particle size in the polymer suspension itself. The comminuting process and equipment are chosen to protect the polymer from significant molecular degradation and to produce the desired dissolution rate when the polymer suspension is introduced into water with mixing.

The Suspension

From a commercial standpoint it is beneficial that the suspension of polymer be stable so that agitation of the stored suspension is minimal or not required, and that polymer concentration be as high as possible to minimize freight costs. Suspensions as high as about 70–75 wt. % polymer solids may be produced according to this invention, depending on particle size, carrier viscosity and the effect of suspending or dispersing agents on suspension viscosity. The preferred range of polymer solids in the suspension is about 50%–70% by weight. Suspension stability is enhanced by relatively fine comminution of the polymer or gum and by a high viscosity liquid carrier. Additionally the carrier may be treated with suitable thickening, dispersing, suspending or viscosity modifying agents such as those well known in the art.

A particularly advantageous method of increasing stability with hydrocarbon oil carriers is to add an oil-in-water emulsifier such as the isooctylphenoxypolyethoxyethanol product sold by Rohm & Haas under the trademark "Triton X-100." When this oil-in-water emulsifier is added to a hydrocarbon carrier it performs the dual functions of increasing suspension stability and emulsifying the hydrocarbon in the water in which the polymer is to subsequently dissolve, thus speeding dissolution of the polymer by exposing oil-free polymer surfaces to the water.

The polymer must not be soluble in the liquid carrier, and the carrier should be substantially water-free. However, the liquid carrier may be either soluble or insoluble in water.

Since the liquid carrier is substantially water-free, a water-in-oil emulsion is not formed, in contrast to the process of Anderson et al U.S. Pat. Nos. Re. 28,474 and 28,576, identified above. Although the solid polymer may have a substantial water content, this water content does not result in the formation of a water-in-oil emulsion.

Suitable hydrocarbon oil carriers include, but are not limited to, paraffin-based oils such an Conoco's LOPS (low order paraffin solvent) and Exxon's Faxam. Exxon's Isopar M, a deodorized high purity isoparaffinic material, is also suitable, as are the hydrocarbon liquids disclosed in Anderson et al. U.S. Pat. Nos. Re. 28,474 and 28,576.

Water-soluble or water-dispersible carriers in which the polymer is insoluble under practical conditions may also be used in producing the polymer suspension. In the case wherein the liquid carrier is water soluble, no surfactant is needed. Examples of such carriers include, but not limited to, higher alcohols, glycols and glycol ethers.

Dissolving The Polymer

When a polymer-containing suspension of the type described herein is dispersed in water the polymer rapidly dissolves in the water. The polymer containing suspension will produce a water solution in a very short time when compared to the amount of time required to dissolve the conventional solid form of the polymer.

The polymer-containing suspension may be dispersed in water by any suitable means. Where a water insoluble carrier is used, the most convenient means is to use a surfactant present in either the polymer containing suspension or the water in which the polymer is to be dissolved. The surfactant causes the carrier to rapidly emulsify in the water (forming an oil-in-water emulsion), thus expediting formation of the aqueous solution of the polymer. When this technique is used to invert the polymer-containing suspension to an aqueous solution the amount of surfactant present in the water may vary over a range of 0.01% to 30% based on polymer. Good conversion often occurs within the range of 1.0% to 8% based on carrier.

The preferred surfactants for use with a polymer suspension in a hydrocarbon liquid carrier are hydrophilic and water soluble. Any anionic, cationic or nonionic hydrophilic compound can be used as the surfactant although it is best to choose a surfactant whose ionic properties do not react with those of the polymer in solution.

In addition to using water-soluble surfactants with hydrocarbon carriers, other surfactants such as silicones, clays and the like may be used since in certain instances they tend to emulsify a hydrocarbon carrier even though they are not themselves water-soluble.

By the use of this process different polymers may be combined into a single suspension so that when the polymers of the suspension are dissolved in water as a co-solution the technical performance of the mixture is enhanced. Such combinations include, but are not limited to, nonionic polyacrylamide with either anionic or cationic polyacrylamide copolymers, anionic polyacrylamide copolymer with biopolysaccharide, polyethylene oxide with nonionic polyacrylamide, polyethylene oxide with cationic or anionic polycrylamide copolymers, or biopolysaccharide with galactomannan gums.

EXAMPLES

Examples 1-26

To illustrate the invention, Examples 1-26 are summarized below in the Table. A variety of suspensions were prepared containing different water-soluble polymers and gums and using differing types of liquid carriers. The suspensions were then converted to polymer solutions in water using different conversion techniques and the time for polymer dissolution was compared to that for dissolution of the dry polymer or gum in its commercially available form. In all cases significant reductions in dissolving time were noted and the usual problems associated with handling and dispersing dry polymer or gum were eliminated.

In those Examples in which the liquid carrier was a hydrocarbon oil, the hydrocarbon oil was a mixture comprising #2 diesel oil (50%) and Faxam ®22 (50%). (Faxam ®22 is a general purpose paraffin based oil marketed by Exxon.) In those Examples in which a surfactant was present, the surfactant was Triton X-100 and was present in the suspension or water in an amount calculated to give a nominal 2 wt % surfactant content, based on product. Where an emulsifier was used, the emulsifier was Triton X-100, and was present in the suspension in an amount calculated to give an emulsifier concentration of about 2 wt %, based on suspension.

In Example 26, a small amount (about 1% by weight, based on suspension) Bentone SD-1 (a clay dispersant sold by NL Industries) was added to the suspension in order to enhance stability.

All percentages of carrier and polymer or gum are based on the total suspension. In each Example, sufficient suspension was mixed with water to give an aqueous solution polymer concentration of about 0.2 wt %.

TABLE

| Example | Carrier % by weight | Carrier Type | Polymer or Gum % by weight | Polymer or Gum Type | Comminution Process | Particle Size (Microns) | Emulsifier | Conversion Method** | Dissolution Time (Minutes) |
|---|---|---|---|---|---|---|---|---|---|
| 1 | none | — | 100 | acrylamide | none | 400-800 | No | — | >60 |
| 2 | 48 | Hydrocarbon oil | 52 | acrylamide | B | <70 | No | 1 | 30 |
| 3 | 48 | Hydrocarbon oil | 52 | acrylamide | B | <70 | Yes | 2 | <10 |
| 4 | 48 | Hydrocarbon oil | 52 | acrylamide | B | <70 | Yes | 3 | <10 |
| 5 | 90 | Hydrocarbon oil | 10 | acrylamide | B | <70 | Yes | 2 | <10 |
| 6 | 30 | Hydrocarbon oil | 70 | acrylamide | B | <70 | Yes | 2 | <10 |
| 7 | none | — | 100 | acrylamide (75%) DMAEM (25%) copolymer | none | 400-800 | No | — | >60 |
| 8 | 45 | Hydrocarbon oil | 55 | acrylamide (75%) DMAEM (25%) copolymer | B | <70 | Yes | 2 | <10 |
| 9 | none | — | 100 | acrylamide (63%) sodium acrylamide (37%) copolymer | none | 400-800 | No | — | >60 |
| 10 | 45 | Hydrocarbon oil | 55 | acrylamide (63%) sodium acrylate (37%) copolymer | B | <70 | Yes | 2 | <10 |
| 11 | none | — | 100 | acrylamide | none | 400-800 | No | — | >60 |
| 12 | 50 | Glycol ether | 50 | acrylamide | B | <70 | No | 1 | <10 |
| 13 | none | — | 100 | guar | none | 200-400 | No | — | >30 |
| 14 | 45 | Hydrocarbon oil | 55 | guar | A | <50 | Yes | 2 | <10 |
| 15 | none | — | 100 | biopolysaccharide (BPS) | none | >200 | No | — | >15 |
| 16 | 50 | Hydrocarbon oil | 50 | BPS | A | <50 | Yes | 2 | <5 |
| 17 | none | — | 100 | Polyethylene oxide | none | >100 | No | — | >20 |
| 18 | 50 | Hydrocarbon oil | 50 | Polyethylene oxide | B | <40 | Yes | 2 | <5 |
| 19 | none | — | 100 | BPS | none | >200 | No | — | >15 |
| 20 | 45 | Ethylene glycol | 55 | BPS | A | <50 | No | 1 | <5 |
| 21 | none | — | 100 | 50% [acrylamide (63%) Na acrylate (37%) copolymer] 50% BPS | none | 200-800 | No | — | >60 |
| 22 | 45 | Hydrocarbon oil | 55 | 50% [acrylamide (63%) Na acrylate (37%) copolymer] (50%) BPS | B | <70 | | 2 | <10 |
| 23 | none | — | 100 | 50% BPS 50% Locust bean | none | >200 | No | — | >20 |
| 24 | 45 | Hydrocarbon oil | 55 | 50% BPS 50% Locust bean | A | <40 | Yes | 2 | <5 |
| 25 | none | — | 100 | acrylamide | none | 400-800 | No | — | >60 |
| 26 | 45 | Hydrocarbon oil* | 55 | acrylamide | B | <70 | Yes | 2 | <10 |

A - ambient temperature grinding
B - cryogenic grinding
*Bentone SD-1 added to hydrocarbon oil to improve suspension stability
**Where dashes are present, dry polymer or gum was dissolved in water with agitation only.
1. Conversion with agitation only
2. Conversion with surfactant in suspension
3. Conversion with surfactant added to water

Example 27

A sample of dry polyacrylamide (400-800 micron particle size) was dissolved directly in water by agitation to form a 0.15 wt. % solution. Dissolution required mixing for 75 minutes. The solution viscosity was measured as 23.6 cps.

Two samples of polymer from the same batch were ground to 70 microns using a cryogenic process, and an ambient grinding process in an air classifying mill (ACM) pulverizer sold by MikroPul, Inc., respectively. Both ground samples were suspended in surfactant-containing hydrocarbon oil and converted in water, according to the procedure of Example 4. Both samples of polymer dissolved in less than 10 minutes. Aqueous polymer solutions (0.15 wt. % polymer) from the two grinds had viscosities of 24.2 cps (cryogenic grind) and 14.2 cps (ambient temperature grind).

This Example demonstrates one advantage of comminution by cryogenic grinding over comminution by molecularly-destructive ambient temperature grinding.

The foregoing detailed description is given for clearness of understanding, and no unnecessary limitations should be inferred therefrom, as variations within the scope of the invention will be obvious to those skilled in the art.

I claim:

1. A method of rapidly dissolving a water-soluble polymer or gum in water which comprises the steps of:
   (a) preparing finely-divided particles of said polymer or gum by comminuting said polymer or gum under substantially non-molecularly destructive conditions;
   (b) dispersing said particles in a substantially water-free liquid carrier in which said polymer or gum is substantially insoluble to form a suspension; and,
   (c) adding said suspension to water with sufficient mixing to disperse and rapidly dissolve said particles in said water.

2. The method of claim 1 wherein the liquid carrier is a hydrocarbon oil and a hydrophilic emulsifier is present in the suspension or in the water in which the polymer or gum is to be dissolved, so as to form an oil-in-water emulsion in step 1(c) to promote rapid dissolution.

3. The method of claim 1 wherein said particles are insoluble in the liquid carrier, and said liquid carrier is soluble or easily dispersible in the water to which the suspension is added.

4. The method of claim 1 wherein said polymer or gum comprises between about 10% and about 70% by weight of said suspension.

5. The method of claim 1 wherein a suspending or dispersing agent is present in said liquid carrier.

6. The method of claim 1 wherein said polymer or gum comprises a blend of one or more polymer(s) and gum(s).

7. The method of claim 1 wherein the size of said particles is less than about 70 microns.

8. The method of claim 1 wherein said comminution step is carried out by means of cryogenic grinding.

9. A method of rapidly dissolving a water-soluble polymer or gum in water which comprises the steps of:
   (a) preparing finely-divided particles of said polymer or gum by comminuting said polymer or gum under substantially non-molecularly destructive conditions;
   (b) dispersing said particles in a substantially water-free liquid carrier in which said polymer or gum is substantially insoluble to form a suspension, said liquid carrier being soluble in water; and,
   (c) adding said suspension to water with mixing.

10. The method of claim 9 wherein said polymer or gum comprises between about 10% and about 70% by weight of said suspension.

11. The method of claim 9 wherein said polymer or gum comprises a blend of one or more polymer(s) and gum(s).

12. The method of claim 9 wherein the size of said particles is less than about 70 microns.

13. The method of claim 9 wherein said commiunution step is carried out by means of cryogenic grinding.

14. A method of rapidly dissolving a polyacrylamide polymer in water which comprises the steps of:
   (a) preparing finely-divided particles of said polyacrylamide polymer by comminuting said polymer under cryogenic grinding conditions;
   (b) dispersing said particles in a substantially water-free liquid carrier in which said polymer is substantially insoluble to form a suspension; and,
   (c) adding said suspension to water with sufficient mixing to disperse and rapidly dissolve said particles in said water.

15. The method of claim 14 wherein the liquid carrier is a hydrocarbon oil and a hydrophilic emulsifier is present in the suspension or in the water in which said polymer is to be dissolved, so as to form an oil-in-water emulsion in step 1(c) to promote rapid dissolution.

16. The method of claim 14 wherein said particles are insoluble in the liquid carrier, and said liquid carrier is soluble or easily dispersible in the water to which the suspension is added.

17. The method of claim 14 wherein said polymer comprises between about 10% and about 70% by weight of said suspension.

18. The method of claim 14 wherein a suspending or dispersing agent is present in said liquid carrier.

19. The method of claim 14 wherein the size of said particles is less than about 70 microns.

20. A method of rapidly dissolving a polyacrylamide polymer in water which comprises the steps of:
   (a) preparing finely-divided particles of said polyacrylamide polymer by comminuting said polymer under cryogenic grinding conditions;
   (b) dispersing said particles in a substantially water-free liquid carrier in which said polymer is substantially insoluble to form a suspension, said liquid carrier being soluble in water; and,
   (c) adding said suspension to water with mixing.

21. The method of claim 20 wherein said polymer comprises between about 10% and 70% by weight of said suspension.

22. The method of claim 20 wherein the size of said particles is less than about 70 microns.

* * * * *